(12) United States Patent
Roberts et al.

(10) Patent No.: US 6,544,328 B2
(45) Date of Patent: Apr. 8, 2003

(54) PROCESS FOR PREPARING PIGMENT DISPERSIBLE IN PAINTS AND PLASTICS CONCENTRATES

(75) Inventors: Bruce L. Roberts, Norman, OK (US); Jeffrey D. Elliott, Oklahoma City, OK (US); Ronnie L. Hoskins, Yukon, OK (US); Bruce R. Palmer, Edmond, OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 0 days.

(21) Appl. No.: 09/771,050

(22) Filed: Jan. 26, 2001

(65) Prior Publication Data

US 2003/0029358 A1 Feb. 13, 2003

(51) Int. Cl.⁷ .............................. C09C 1/36; C08K 3/00; C04B 14/04
(52) U.S. Cl. ..................... 106/436; 106/438; 106/442; 106/445; 106/447; 106/450; 106/481; 106/483
(58) Field of Search ................................. 106/436, 438, 106/442, 445, 447, 450, 481, 483

(56) References Cited

U.S. PATENT DOCUMENTS

| | | | | |
|---|---|---|---|---|
| 3,844,811 A | * | 10/1974 | Brynko | 106/309 |
| 3,859,115 A | * | 1/1975 | Wiseman et al. | 117/70 A |
| RE31,602 E | * | 6/1984 | Makinen | 106/300 |
| 4,909,852 A | * | 3/1990 | Atkinson | 106/448 |
| 5,282,898 A | * | 2/1994 | Wu | 106/447 |
| 5,554,215 A | * | 9/1996 | Simpson et al. | 106/436 |
| 5,643,974 A | * | 7/1997 | Simpson et al. | 523/334 |
| 5,672,201 A | * | 9/1997 | Simpson et al. | 106/447 |
| 5,733,365 A | | 3/1998 | Halko et al. | 106/437 |
| 5,777,001 A | | 7/1998 | Seeney et al. | 523/205 |
| 5,908,498 A | | 6/1999 | Kauffman et al. | 106/437 |
| 6,231,662 B1 | * | 5/2001 | Atkinson | 106/449 |
| 6,340,387 B1 | | 1/2002 | Orth-Gerber et al. | |
| 6,348,092 B1 | * | 2/2002 | Atkinson | 106/505 |

FOREIGN PATENT DOCUMENTS

WO WO 00/53679 9/2000

* cited by examiner

Primary Examiner—Elizabeth D. Wood
Assistant Examiner—Patricia L. Hailey
(74) Attorney, Agent, or Firm—McAfee & Taft; C. Clark Dougherty, Jr.

(57) ABSTRACT

A process for preparing an improved pigment which is readily dispersible in paints and plastics concentrates is provided. In accordance with the process, a particulate pigment is mixed with water to form a slurry thereof, and a surface active agent is mixed with the slurry so that the pigment therein is coated therewith. A preferred surface active agent is a mixture of ethoxylated sorbitan derivatives, non-ethoxylated mono and diglycerides and ethoxylated mono and diglycerides. After the pigment has been coated with the surface active agent, the coated pigment is dried.

32 Claims, No Drawings

PROCESS FOR PREPARING PIGMENT DISPERSIBLE IN PAINTS AND PLASTICS CONCENTRATES

BACKGROUND OF THE INVENTION

1. Field of the Invention

The present invention relates to a process for preparing improved inorganic pigment having enhanced dispersibility in paints and plastics concentrates as determined by the time or energy required to achieve dispersal.

2. Description of the Prior Art

Inorganic pigments such as titanium dioxide, zinc sulfide, zinc oxide and the like are used in paint, plastics and other products. Such pigments have heretofore been difficult to disperse in paints and plastics concentrates, i.e., the pigments have required long time periods and/or high levels of energy to achieve dispersal. Inorganic pigments are generally in the form of a finely divided powder which has been jet-milled or micronized as a final step in their production.

More recently, processes have been developed and used for preparing low-dusting, free-flowing pigment which requires less energy to disperse in paints and plastics concentrates. For example, U.S. Pat. No. 5,733,365 issued to Halko et al. on Mar. 31, 1998 and its related U.S. Pat. No. 5,908,498 issued to Kauffman et al. on Jun. 1, 1999 disclose a process for preparing improved low-dusting, free-flowing pigments which have not been subjected to final micronizing treatments. The process is comprised of the steps of providing an inorganic pigment material which has not been micronized, providing a source of water, forming a fine, well dispersed slurry of the pigment and water, milling the slurry, adjusting the pH of the slurry, depositing a treating agent having the formula $ROOCCHSO_3MCH_2COOR'$ wherein R and R' are monovalent alkyl radicals having from about 2 to about 20 carbon atoms and M is a metallic monovalent cation on the slurried milled pigment, and then drying the pigment material having the treating agent deposited thereon. The presence of the treating agent makes the pigment produced more readily dispersible in paints and plastics concentrates.

While the pigments produced in accordance with the teachings of the above described patents constitute a major improvement as compared to prior pigments, the dispersal of the pigments in paints and plastics concentrates still requires considerable mixing time, energy and expense.

Thus, there is a continuing need for a process for preparing improved pigments which are more easily dispersed in paints and plastics concentrates.

SUMMARY OF THE INVENTION

The present invention provides a process for preparing improved pigment which is more readily dispersible in paints and plastics concentrates, and therefore, meets the need described above and overcomes the deficiencies of the prior art. The process of this invention basically comprises the steps of: (a) mixing a particulate pigment with water to form a slurry of the pigment and water; (b) mixing a surface active agent with the slurry of step (a) so that the pigment is coated therewith, the surface active agent being selected from the group consisting of alkyl alcohols ethoxylated with from about 4 to about 14 ethylene oxide groups and wherein the alkyl groups have from about 6 to about 16 carbons atoms, ethoxylated sorbitan derivatives having HLB values in the range of from 1 to about 20, a mixture of non ethoxylated mono and diglycerides and ethoxylated mono and diglycerides having HLB values in the range of from 1 to about 20 and mixtures of said ethoxylated sorbitan derivatives, said non-ethoxylated mono and diglycerides and said ethoxylated mono and diglycerides; and (c) drying the pigment coated in accordance with step (b).

Another process of this invention for preparing improved pigment which is highly dispersible in paints and plastics concentrates comprises the steps of: (a) mixing a particulate pigment with water to form a slurry of the pigment and water; (b) milling the slurry formed in step (a) to produce a pigment particle size in the range of from about 0.1 micron to about 1 micron; (c) mixing a surface active agent with the slurry of step (b) so that said pigment is coated therewith, said surface active agent being selected from the group described above; and (d) drying the pigment coated in accordance with step (c).

It is, therefore, a general object of the present invention to provide a process for preparing improved pigments which are more readily dispersible in paints and plastics concentrates.

Other and further objects, features and advantages of the present invention will be readily apparent to those skilled in the art upon a reading of the description of preferred embodiments which follows.

DESCRIPTION OF PREFERRED EMBODIMENTS

As mentioned, it has heretofore been difficult to disperse particulate pigment in paints and plastics concentrates or melts. The pigments utilized in paints and plastics concentrates include, but are not limited to, white opacifying pigments such as titanium dioxide, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide and the like. Of the foregoing pigments, inorganic pigments are preferred with titanium dioxide being the most preferred.

The pigments produced by the present invention are more readily dispersed in paints and plastics concentrates and require less time and/or energy to disperse than prior art pigments. The treated pigments produced by this invention can be low-dusting and free-flowing non-micronized pigments or the treated pigments can optionally be micronized.

The process of the present invention for preparing improved pigment which is more readily dispersible in paints and plastics concentrates is basically comprised of the following steps: (a) mixing a particulate pigment with water to form a slurry of the pigment and water; (b) mixing a surface active agent with the slurry of step (a) so that the pigment is coated therewith; and (c) drying the pigment coated in accordance with step (b).

The particulate pigment utilized in step (a) of the above process is preferably pigment which has not been milled or micronized. The preferred non-treated titanium dioxide pigment for use in the process of this invention can be of either the anatase or rutile crystalline structure or a combination thereof. The titanium dioxide pigment can be produced by a commercial process which is well known to those skilled in the art such as the sulfate process or the vapor phase chloride oxidation process.

The surface active agents which can be utilized in accordance with the present invention include alkyl alcohols ethoxylated with from about 4 to about 14 ethylene oxide groups and wherein the alkyl groups have from about 6 to about 16 carbon atoms, ethoxylated sorbitan derivatives having hydrophile-lipophile balances (HLB values) in the range of from about 1 to about 20, a mixture of non-ethoxylated mono and diglycerides and ethoxylated mono and diglycerides having HLB values in the range of from about 1 to about 20 and mixtures of said ethoxylated sorbitan derivatives, said non-ethoxylated mono and diglycerides and said ethoxylated mono and diglycerides.

Of the foregoing surface active agents, a mixture of ethoxylated sorbitan derivatives having HLB values in the range of from about 2 to about 15, non-ethoxylated mono and diglycerides having HLB values in the range of from about 2 to about 15 and ethoxylated mono and diglycerides having HLB values in the range of from about 2 to about 15 is preferred. The ethoxylated sorbitan derivatives are preferably present in the mixture in an amount in the range of from about 5% to about 100% by weight of the mixture with the non-ethoxylated mono and diglycerides and ethoxylated mono and diglycerides making up the remainder of the mixture. A more preferred mixture of the ethoxylated sorbitan derivatives, non-ethoxylated mono and diglycerides and ethoxylated mono and diglycerides contain the ethoxylated sorbitan derivatives in an amount in the range of from about 15% to about 70% by weight of the mixture with the non-ethoxylated and ethoxylated mono and diglycerides making up the remainder of the mixture. Most preferably, the surface active agent mixture contains the ethoxylated sorbitan derivatives in an amount of about 70% with non-ethoxylated and ethoxylated mono and diglycerides making up the remaining 30% by weight of the mixture.

An example of a suitable commercially available ethoxylated sorbitan derivative which can be utilized in accordance with this invention is an ethoxylated sorbitan monooleate sold by BASF Corporation under the trade designation "T-MAZ-81™." An example of a suitable commercially available mixture of non-ethoxylated mono and diglycerides and ethoxylated mono and diglycerides which can be utilized is sold by Loders Croklaah Company under the trade designation "Tally 100 Plus™."

The slurry formed in step (a) described above generally contains pigment in an amount in the range of from about 10% to about 50% by weight of the slurry, preferably an amount in the range of from about 20% to about 40% and most preferably about 34%. The slurry is generally formed in accordance with step (a) at a temperature in the range of from about 10° C. to about 90° C., preferably from about 15° C. to about 80° C. and most preferably at a temperature of about 25° C.

The pH of the slurry formed in step (a) is adjusted, if necessary, to a pH in the general range of from about 7.0 to about 13.0, more preferably a pH of from about 8.0 to about 11.0 and most preferably about 9.5. Also, the slurry can optionally be filtered to increase the pigment content of the slurry to in the range of from about 40% to about 95% solids prior to carrying out step (b).

The process of the present invention can also optionally include the step of coating the pigment with a metal oxide while the pigment is in the slurry formed in step (a). Examples of metal oxides which can be used include, but are not limited to, aluminum oxide, silica and zirconium oxide. Preferably, the coating of the pigment with a metal oxide yields a coating of from about 0.25% to about 1.5% metal oxide by weight of pigment. Such coatings improve the pigmentary properties of the pigment product and are well known to those skilled in the art.

The surface active agent utilized is generally mixed with the slurry in accordance with step (b) in an amount in the range of from about 0.1% to about 5.0% by weight of pigment in the slurry, preferably in an amount in the range of from about 0.25% to about 2.0% and most preferably in an amount of 1.0%. The mixing of the surface active agent with the slurry in accordance with step (b) is generally carried out in a time period in the range of from about 5 minutes to about 24 hours, preferably in a time period from about 5 minutes to about 30 minutes and most preferably in a time period of about 5 minutes.

The surface active agent is generally coated on the pigment in accordance with step (b) in an amount in the range of from about 0.1% to about 5% by weight of the pigment, preferably in an amount of from about 0.5% to about 2% by weight of the pigment and most preferably in an amount of about 1%.

The drying of the surface active agent coated pigment in accordance with step (c) is preferably carried out by spray drying the pigment. However, as will be understood by those skilled in the art, other drying equipment can be utilized such as an agglomerator, a fluid bed dryer or the like. As mentioned above, if desired, the dried coated pigment can be micronized.

A preferred process of the present invention for preparing an improved titanium dioxide pigment which is more readily dispersible in paints and plastics concentrates than prior art pigments comprises the following steps: (a) mixing a particulate titanium dioxide pigment with water to form a slurry of the pigment and water; (b) mixing a surface active agent with the slurry of step (a) so that the pigment is coated therewith, the surface active agent being a mixture of ethoxylated sorbitan derivatives having HLB values in the range of from about 2 to about 15, nonethoxylated mono and diglycerides having HLB values in the range of from about 2 to about 15 and ethoxylated mono and diglycerides having HLB values in the range of from about 2 to about 15; and (c) spray drying the titanium dioxide pigment coated in accordance with step (b).

The ethoxylated sorbitan derivative in the mixture of surface active agents is preferably present therein in an amount of about 70% by weight of the mixture with the non-ethoxylated mono and diglycerides and ethoxylated mono and diglycerides making up the remainder of the mixture. Also, the pigment is preferably present in the slurry formed in step (a) in an amount of about 34% by weight of the slurry and the slurry is preferably formed at a temperature of about 25° C. The surface active agent mixture is mixed with the slurry in accordance with step (b) in an amount of about 1% by weight of pigment in the slurry, and the surface active agent is preferably coated on the pigment in accordance with step (b) in an amount of about 1% by weight of the pigment. Step (c) is preferably carried out in a time period of about 5 minutes. When the pigment is coated with a metal oxide during step (a), if necessary, the pH of the slurry can be adjusted to in the range of from about 8 to about 11. Also, as mentioned above, the slurry can be filtered to increase the concentration of pigment in the slurry prior to carrying out step (b).

Another process of this invention for preparing improved pigment which is more readily dispersible in paints and plastics concentrates is basically comprised of the following steps: (a) mixing a non-micronized particulate pigment with water to form a slurry of the pigment and water; (b) milling the slurry formed in step (a) to produce a pigment particle size therein in the range of from about 0.1 micron to about 1 micron; (c) mixing a surface active agent with the slurry of step (b) so that the pigment is coated therewith; and (d) drying the pigment coated in accordance with step (c). As mentioned, the dried pigment can be micronized if desired.

The surface active agents which can be utilized in the immediately preceding process for preparing pigment are the same as those described above. Also, the slurry formed in step (a) contains pigment in the amounts set forth above and has a temperature in the range described above.

The milling of the slurry in step (b) is carried out to produce a pigment particle size in the slurry in the range of form about 0.1 micron to about 1 micron, preferably a size in the range of from about 0.1 micron to about 0.8 micron and most preferably about 0.2 micron. While a variety of milling apparatus can be utilized, a sand mill is preferred.

After the slurry is milled, and as mentioned above, the pH of the slurry can be adjusted to the levels described above and can be filtered as described above. Further, the pigment in the milled slurry can be coated with a metal oxide in the amounts described above.

The surface active agent utilized is generally mixed with the slurry in accordance with step (c) in the amounts given above, the mixing of the surface active agent with the slurry is carried out in the time mentioned above and the surface active agent is coated on the pigment in the amounts given above. Finally, the drying of the surface active agent coated pigment in accordance with step (d) is preferably carried out by spray drying the pigment but other drying equipment can be utilized. If the dried product produced in step (d) is subsequently micronized, a jet mill is preferably utilized.

A preferred process of the present invention for preparing an improved titanium dioxide pigment which is dispersible in paints and plastics concentrates comprises the following steps: (a) mixing a non-micronized particulate titanium dioxide pigment with water to form a slurry of the pigment and water; (b) milling the slurry formed in step (a) to produce a pigment particle size therein in the range of from about 0.1 micron to about 1.0 micron; (c) mixing a surface active agent with the slurry of step (b) so that the pigment is coated therewith, the surface active agent being a mixture of ethoxylated sorbitan derivatives having HLB values in the range of from about 2 to about 15, non-ethoxylated mono and diglycerides having HLB values in the range of from about 2 to about 15 and ethoxylated mono and diglycerides having HLB values in the range of from about 2 to about 15; and (d) spray drying the titanium dioxide pigment coated in accordance with step (c).

The ethoxylated sorbitan derivative in the mixture of surface active agents is preferably present therein in an amount of about 70% by weight of the mixture with the non-ethoxylated mono and diglycerides and ethoxylated mono and diglycerides making up the remainder of the mixture. Also, the pigment is preferably present in the slurry formed in step (a) in an amount of about 34% by weight of the slurry, and the slurry is preferably formed at a temperature of about 25° C. The surface active agent mixture is mixed with the slurry in accordance with step (c) in an amount of about 1% by weight of pigment in the slurry, and the surface active agent is preferably coated on the pigment in accordance with step (c) in an amount of about 1% by weight of the pigment. Also, step (c) is preferably carried out in a time period of about 5 minutes. The dried titanium dioxide pigment produced in step (d) can be micronized if desired, preferably by jet milling.

As mentioned above, if desired, the pigment can be coated with a metal oxide during step (b), and, if necessary, the pH of the slurry can be adjusted to in the range of from about 8 to about 11. Also, as mentioned above, the slurry can be filtered to increase the concentration of pigment in the slurry prior to carrying out step (c).

The dispersible pigments of this invention are particularly suitable for use in the preparation of paints and plastics concentrates. In preparing the paints and plastics concentrates, the pigment is incorporated into the paints or plastics in an amount which varies depending upon the level of pigmentation required in the final or finished end product. Generally, the paints and plastics concentrates can contain weight ratios of the pigment of this invention to the paints or plastics in which they are dispersed in the range of from about 0.5:1 to about 5:1. Within the above range, the pigment of this invention can be easily and uniformly dispersed or distributed throughout the paint or plastic.

In order to further illustrate the process of the present invention, the following examples are given.

EXAMPLE 1

A titanium dioxide, chloride grade, burner discharge pigment was dispersed in water at 34% by weight pigment and sandmilled until 97% of the pigment particles were less than 0.63 microns in diameter as measured by a Micro Treck particle size analyzer. The slurry was pressure filtered in the presence of a cationic flocculent. The resulting filter cake was redispersed in water containing a mixture of 70% commercially available ethoxylated sorbitan monooleate (T-Maz-81) and 30% of a commercially available mixture of non-ethoxylated and ethoxylated mono and di glycerides (Tally 100 Plus), the mixture being present in the water in an amount of 1% by weight of the pigment dispersed therein. Water was added to the slurry until the rheological characteristics of the slurry allowed pumping and feeding to a spray drier. The finished pigment had a tap density of 1.7 and an aerated density of 0.9. The equilibrium torque for the finished pigment as measured by a Brabender torque rheometer instrument was 1166 meter-grams in a low density polyethylene with a pigment loading of 75% by weight. By comparison, two dusty and poor flowing titanium dioxide pigments, presently sold in the commercial market by others had equilibrium torque values of 1220 and 1270 in the same test.

EXAMPLE 2

The same pigment procedures and additives as in Example 1 were used except that the pigment was sand-milled until 97% of the particles were less than 0.63 microns in diameter as measured by a Micro Treck particle size analyzer. The chloride grade burner discharge titanium dioxide pigment was dispersed in water at 34% by weight pigment and sandmilled. The slurry was pressure filtered and the filter cake was redispersed in water containing a mixture of the surface active agents described in Example 1, in an amount of 1% by weight of the pigment dispersed therein. Water was added to the slurry until the rheological characteristics of the slurry allowed pumping and feeding to a spray drier. The spray drier discharge was micronized and had an equilibrium torque as measured by a Brabender instrument of 1103 meter-grams in polyethylene with a pigment loading of 75% by weight. By comparison, two dusty and poor flowing titanium dioxide pigments sold in the commercial market by others had equilibrium torque values of 1220 and 1270 in the same test.

EXAMPLE 3

The same chloride grade, burner discharge titanium dioxide pigment was dispersed in water at 34% by weight pigment and sandmilled until 90% of the particles were less than 0.63 microns in diameter as measured by a Micro Treck particle size analyzer. The slurry was pressure filtered and the filter cake was redispersed in water containing a 1% by weight mixture of the surface active agents described in Example 1. Water was added to the slurry until the rheological characteristics of the slurry allowed pumping and feeding to a spray drier. The equilibrium torque for the finished pigment as measured by a Brabender instrument was 1254 meter-grams in polyethylene with a pigment loading of 75% by weight. Two dusty and poor flowing titanium dioxide pigments presently sold in the commercial market by others had equilibrium torque values of 1220 and 1270 in the same test.

EXAMPLE 4

Chloride grade, burner discharge titanium dioxide pigment was dispersed in water at 34% by weight pigment and sandmilled until 90% of the particles were less than 0.63 microns in diameter as measured by a Micro Treck particle size analyzer. The slurry was pressure filtered and the filter cake was redispersed in water containing a 1% by weight mixture of the surface active agents described in Example 1. Water was added to the slurry until the rheological characteristics of the slurry allowed pumping and feeding to the spray drier. The finished pigment had a tap density of 1.7 and an aerated density of 0.9. The equilibrium torque for the finished pigment as measured by a Brabender instrument was 1299 meter-grams in polyethylene with a pigment loading of 75% by weight. Two dusty and poor flowing titanium dioxide pigments presently sold in the commercial market by others had equilibrium torque values of 1220 and 1270 in the same test.

EXAMPLE 5

Chloride grade, burner discharge titanium dioxide was dispersed in water at 34% by weight pigment and sandmilled until 97% of the particles were less than 0.63 microns in diameter as measured by a Micro Treck particle size analyzer. The slurry was then processed so that silica and alumina were deposited on the surface. A mixture of the surface active agents of this invention described in Example 1 was added to the slurry in an amount of 1% by weight of the pigment therein. Water was then added to the slurry until the rheological characteristics of the slurry allowed pumping and feeding to a spray drier. The resulting spray dried pigment was then micronized by jet milling.

The finished pigment of this invention was evaluated for dispersion in an alkyd resin paint formulation. In the evaluation, the dispersion of the pigment of the present invention prepared as described above after being added to an alkyd paint formulation and stirred at a constant rate was compared to the dispersion of two commercial titanium dioxide pigments in the same paint formulation and under the same conditions. The two commercial pigments were sold by others for use in alkyd resin paint formulations.

The dispersions of the three pigments were measured by a Hegman gauge. As the pigment particles being tested become more dispersed and less agglomerated in the alkyd resin paint formulation, the Hegman gauge indicated a higher value. The results of the tests are shown in the table below wherein "Pigment A" is the treated pigment of the present invention and "Pigment B" and "Pigment C" are the two commercial pigments.

TABLE

| Time After Pigment Added, min. | Hegman Gauge Value | | |
|---|---|---|---|
| | Pigment A | Pigment B | Pigment C |
| 5 | 8 | 0.5 | 0 |
| 10 | 8 | 2.5 | 0 |
| 15 | 8 | 5 | 0 |
| 20 | 8 | 5.5 | 0 |
| 25 | 8 | 6.5 | 0.5 |
| 30 | 8 | 7.5 | 1 |
| 35 | 8 | 8 | 2 |

As can be seen from the Table, the treated pigment of this invention was completely dispersed in 5 minutes. Pigment B was not completely dispersed until being stirred for about 35 minutes and Pigment C was only beginning to disperse after 35 minutes.

While the treated pigments described in the above mentioned U.S. Pat. No. 5,733,365 issued to Halko et al. on Mar. 31, 1998 and its related U.S. Pat. No. 5,908,498 issued to Kauffman et al. on Jun. 1, 1999 have improved properties, the dispersal of the pigments in paints and plastics concentrates still requires considerable mixing time. For example, the lowest equilibrium torque measured by a Brabender instrument for treated titanium dioxide pigment in a low density polyethylene with a pigment loading of 75% by weight set forth in the examples of either patent is 1340 meter-grams. This is compared with the equilibrium torque of the treated titanium dioxide pigment of the present invention measured in the same way using the same instrument which is a low of 1103 meter-grams (Example 2) and a high of 1299 meter-grams (Example 4). It should also be noted that the polyolefin melts utilized in the examples to which the treated pigments of the Halko et al. and Kauffman et al. patents were added included a zinc stearate lubricant that results in lower equilibrium torque when present. No lubricant was utilized in the tests set forth in the Examples of this application. Without the inclusion of the zinc stearate lubricant in the polyethylene melts, the lowest equilibrium torque value obtained in the tests set forth in the Halko et al. and Kauffman et al. patents would have been about 1500 metergrams which is substantially higher than 1103 to 1299 meter-gram values obtained in the Examples of this application.

Thus, the present invention is well adapted to carry out the objects and attain the ends and advantages mentioned as well as those which are inherent therein. While numerous changes may be made by those skilled in the art, such changes are encompassed by the spirit of this invention as defined by the appended claims.

What is claimed is:

1. A process for preparing a pigment which is dispersible in paints and plastics concentrates comprising the steps of:
    (a) mixing a particulate pigment with water to form a slurry of the pigment and water;
    (b) mixing a surface active agent with said slurry of step (a) so that said pigment is coated therewith, said surface active agent being selected from the group consisting of ethoxylated sorbitan derivatives having HLB values in the range of from 1 to about 20, a mixture of non-ethoxylated mono and diglycerides and ethoxylated mono and diglycerides having HLB values in the range of from 1 to about 20 and mixtures of said ethoxylated sorbitan derivatives, said non-ethoxylated mono and diglycerides and said ethoxylated mono and diglycerides; and (c) drying said pigment coated in accordance with step (b).

2. The process of claim 1 wherein said surface active agent is a mixture of ethoxylated sorbitan derivatives having HLB values in the range of from about 2 to about 15, non-ethoxylated mono and diglycerides having HLB values in the range of from about 2 to about 15 and ethoxylated mono and diglycerides having HLB values in the range of from about 2 to about 15.

3. The process of claim 2 wherein said ethoxylated sorbitan derivative are present in said mixture in an amount in the range of from about 5% to about 100% by weight of said mixture with said non-ethoxylated mono and diglycerides and said ethoxylated mono and diglycerides making up the remainder of said mixture.

4. The process of claim 1 wherein said pigment is titanium dioxide.

5. The process of claim 1 wherein said slurry formed in step (a) contains pigment in an amount in the range of from about 10% to about 50% by weight of said slurry.

6. The process of claim 1 wherein said slurry formed in step (a) is at a temperature in the range of from about 10° to about 90° C.

7. The process of claim 1 wherein said surface active agent is mixed with said slurry in accordance with step (b) in an amount in the range of from about 0.1% to about 5% by weight of pigment in said slurry.

8. The process of claim 1 wherein said surface active agent is coated on said pigment in accordance with step (b) in an amount in the range of from about 0.1% to about 5% by weight of said pigment.

9. The process of claim 1 wherein step (b) is carried out in a time period in the range of from about 5 minutes to about 60 minutes.

10. The process of claim 1 wherein said pigment is dried in accordance with step (c) by spray drying said pigment.

11. The process of claim 1 which further comprises coating said pigment with a metal oxide after forming the slurry in accordance with step (a).

12. The process of claim 11 wherein said metal oxide is selected from the group consisting of aluminum oxide, silicon oxide and zirconium oxide.

13. The process of claim 1 which further comprises micronizing said dried pigment.

14. A process for preparing a low dusting, free-flowing, pigment which is dispersible in paints and plastics concentrates comprising the steps of:

(a) mixing a non-micronized particulate pigment with water to form a slurry of the pigment and water;

(b) milling the slurry formed in step (a) to produce a pigment particle size therein in the range of from about 0.1 micron to about 1 micron;

(c) mixing a surface active agent with said slurry of step (b) so that said pigment is coated therewith, said surface active agent being selected from the group consisting of ethoxylated sorbitan derivatives having HLB values in the range of from 1 to about 20, a mixture of non-ethoxylated mono and diglycerides and ethoxylated mono and diglycerides having HLB values in the range of from 1 to about 20 and mixtures of said ethoxylated sorbitan derivatives, said non-ethoxylated mono and diglycerides and said ethoxylated mono and diglycerides; and (d) drying said pigment coated in accordance with step (c).

15. The process of claim 14 wherein said pigment is titanium dioxide pigment.

16. The process of claim 15 wherein said surface active agent is a mixture of ethoxylated sorbitan derivatives having HLB values in the range of from about 2 to about 15, non-ethoxylated mono and diglycerides having HLB values in the range of from about 2 to about 15 and ethoxylated mono and diglycerides having HLB values in the range of from about 2 to about 15.

17. The process of claim 16 wherein said ethoxylated sorbitan derivative are present in said mixture in an amount in the range of from about 5% to about 100% by weight of said mixture with said non-ethoxylated mono and diglycerides and said ethoxylated mono and diglycerides making up the remainder of said mixture.

18. The process of claim 16 wherein said ethoxylated sorbitan derivatives are present in said mixture in an amount of about 70% by weight of said mixture with said non-ethoxylated mono and diglycerides and said ethoxylated mono and diglycerides making up the remainder of said mixture.

19. The process of claim 18 wherein said slurry formed in step (a) contains pigment in an amount of about 34% by weight of said slurry.

20. The process of claim 19 wherein said slurry formed in step (a) is at a temperature of about 25° C.

21. The process of claim 20 wherein said milling in accordance with step (b) is carried out in a sand mill.

22. The process of claim 21 wherein said surface active agent is mixed with said slurry in accordance with step (c) in an amount of about 1% by weight of pigment in said slurry.

23. The process of claim 22 wherein said surface active agent is coated on said titanium dioxide pigment in accordance with step (c) in an amount of about 1% by weight of said pigment.

24. The process of claim 23 wherein step (c) is carried out in a time period of about 5 minutes.

25. The process of claim 24 wherein said pigment is dried in accordance with step (d) by spray drying said pigment.

26. The process of claim 14 which further comprises coating said pigment with a metal oxide after forming the slurry in accordance with step (a).

27. The process of claim 26 wherein said metal oxide is selected from the group consisting of aluminum oxide silicon oxide and zirconium oxide.

28. The process of claim 14 wherein said dried pigment produced in accordance with step (d) is subsequently micronized by jet milling.

29. A process for preparing a paint having a dried pigment dispersed therein comprising the steps of:

(a) mixing a particulate pigment with water to form a slurry of the pigment and water;

(b) mixing a surface active agent with said slurry of step (a) so that said pigment is coated therewith, said surface active agent being selected from the group consisting of ethoxylated sorbitan derivatives having HLB values in the range of from 1 to about 20, a mixture of non-ethoxylated mono and diglycerides and ethoxylated mono and diglycerides having HLB values in the range of from 1 to about 20 and mixtures of said ethoxylated sorbitan derivatives, said non-ethoxylated mono and diglycerides and said ethoxylated mono and diglycerides;

(c) drying said pigment coated in accordance with step (b); and (d) dispersing said dried pigment in said paint.

30. The process of claim 30 wherein said dried pigment is added to said paint in an amount such that the weight ratio of said pigment to said paint is in the range of from about 0.5:1 to about 5:1.

31. A process for preparing a plastics concentrate having a dried pigment dispersed therein comprising the steps of:
   (a) mixing a particulate pigment with water to form a slurry of the pigment and water;
   (b) mixing a surface active agent with said slurry of step (a) so that said pigment is coated therewith, said surface active agent being selected from the group consisting of ethoxylated sorbitan derivatives having HLB values in the range of from 1 to about 20, a mixture of non-ethoxylated mono and diglycerides and ethoxylated mono and diglycerides having HLB values in the range of from 1 to about 20 and mixtures of said ethoxylated sorbitan derivatives, said non-ethoxylated mono and diglycerides and said ethoxylated mono and diglycerides;
   (c) drying said pigment coated in accordance with step (b); and
   (d) dispersing said dried pigment in said plastics concentrate.

32. The process of claim 31 wherein said dried pigment is added to said plastics concentrate in an amount such that the weight ratio of said pigment to said plastics concentrate is in the range of from about 0.5:1 to about 5:1.

* * * * *